United States Patent [19]
Holtzapple et al.

[11] Patent Number: 5,969,189
[45] Date of Patent: Oct. 19, 1999

[54] THERMAL CONVERSION OF VOLATILE FATTY ACID SALTS TO KETONES

[75] Inventors: Mark T. Holtzapple, College Station; Richard R. Davison, Bryan, both of Tex.

[73] Assignee: The Texas A&M University System, College Station, Tex.

[21] Appl. No.: 08/885,774

[22] Filed: Jun. 30, 1997

[51] Int. Cl.⁶ ................................................. C07C 45/45
[52] U.S. Cl. ..................... 568/397; 568/354; 568/579; 562/589; 44/452
[58] Field of Search ..................... 568/338, 354, 568/355, 361, 449, 397, 579; 562/513, 589; 44/452

[56] References Cited

U.S. PATENT DOCUMENTS

| | | | |
|---|---|---|---|
| 4,267,397 | 5/1981 | Schmidt et al. | 568/899 |
| 4,384,872 | 5/1983 | Kester et al. | 44/56 |

FOREIGN PATENT DOCUMENTS

| | | | |
|---|---|---|---|
| 216120 | 5/1923 | United Kingdom . | |

OTHER PUBLICATIONS

Harrison et al, Compendium of Organic Synthetic Methods, p. 111, 1971.

Ardagh, et al., (1924) "Distillation of Acetate of Lime" *Industrial and Engineering Chemistry*, 16:1133–1139.

Schultz et al., (1961) "The Pyrolytic Decomposition of Carboxylate Salts of Ketones," *Journal of Chemical Education*. 38:300–301.

Kirk–Othmer Encyclopedia of Chemical Technology, 3rd Edition, Published by Wiley–Interscience Pub. "Acetone" (1978), vol. 1, p. 180.

Kirk–Othmer Encyclopedia of Chemical Technology, 2nd Edition, Published by Wiley–Interscience Pub. "Calcium Compounds" (1964) 4:6.

Chemical Abstracts "Dipropylketone" Soc. Lefranc et cie. Brit. 216,120, (1923).

Chemical Abstracts "Ketones for motor fuel" E. Depasse, Bull assoc.chim. 60:400–409 (1943).

Chemical Abstracts "General plan for the industrial production of ketones" E. Depasse. Bull. assoc. chim. 62:317–339 (1945).

Conant, et al., (1947) "Aldehydes and Ketones," *The Chemistry of Organic Compounds*, 3rd Edition, pp. 126–127.

Hurd, (1929) "Salts of Organic Acids" *The Pyrolysis of Carbon Compounds*, pp. 480–490.

LeFranc, M.J., "Les Cétones, Carburant A Grand Pouvoir Indétonant, Leur Fabrication Dans Le cadre Des Matieres Premieres Nationales Et 'Imperiales'," Conference faite le Mardi Oct. 28, 1941 au Conservatorie National des Arts et Métiers, pp. 3–27.

Depasse, E., "Les Cétones—Carburants," *Bulletin de l'Association des Chimistes*, vol. 6D, 1943, pp. 400–409.

*Primary Examiner*—Shailendra Kumar
*Assistant Examiner*—S. Padmanabhan
*Attorney, Agent, or Firm*—Baker & Botts, LLP

[57] ABSTRACT

This invention provides a method for thermally converting volatile fatty acid (VFA) salts to ketones by mixing dry calcium salts of VFAs with hot heat transfer agent in an evacuated container, thereby causing thermal decomposition of the calcium salts of VFAs to form ketone-containing vapor and calcium carbonate; and separating the ketone-containing vapor from the calcium carbonate and heat transfer agent by condensing a mixture of ketones from the ketone-containing vapor.

17 Claims, 3 Drawing Sheets

THERMAL CONVERSION OF VOLATILE FATTY ACID SALTS TO KETONES

BACKGROUND OF THE INVENTION

1. Field of the Invention

This invention provides an improved process for thermally converting volatile fatty acid (VFA) salts (e.g. calcium acetate, propionate, butyrate) to ketones.

2. Review of Related Art

There are two useful methods for producing ketones from fatty acids (Conant and Blatt, "The Chemistry of Organic Compounds," Macmillan Co., New York, 1947). In one method, ketones may be prepared from fatty acids directly by passing them over a catalyst (e.g. MnO or $ThO_2$) at 300° C., according to Equation (1):

$$2RCOOH(g) \rightarrow R_2CO(g) + H_2O(g) + CO_2(g) \qquad (1)$$

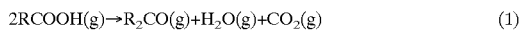

According to this reaction, pure acetic acid yields only acetone, but a mixture of acids will yield mixed ketones. For example, if acetic acid and propionic acid were fed to such a reactor, the products will be acetone, methyl ethyl ketone, and diethyl ketone.

In an alternative method, ketones are produced from VFA salts, and no catalyst is necessary. Calcium or sodium salts of VFAs decompose at temperatures of 300–400° C., according to exemplary Equation (2):

$$[RCOO]_2Ca(s) \rightarrow R_2CO(g) + CaCO_3(s) \qquad (2)$$

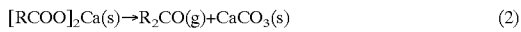

This reaction has a "fairly high" yield, as long as the ketone decomposition temperature is not exceeded (Hurd, "The Pyrolysis of Carbon Compounds, "The Chemical Catalog Co., New York, 1929).

In 1834, Peligot heated calcium acetate and obtained acetone (see Mellan, "Ketones," Chemical Publishing Co., New York, 1968). In the latter half of the 19th century, the process was applied industrially to produce acetone, using calcium acetate obtained from the distillation of wood.

Ardagh and his coworkers produced some of the best experimental data available for the decomposition of calcium acetate (Ardagh et al., *Industrial and Engineering Chemistry*, 16:1133–1139, 1924). They found that the contemporary literature cited a variety of temperatures for decomposition, from 290 to 500° C.; Ardagh, et al., concluded that a temperature of "between 430 and 490° C. is satisfactory," although they found that the reaction actually commences as low as 160° C. They also calculated the yield of acetone from calcium acetate to be 99.5% of the theoretical yield after a 7-hour reaction at 430° C.; after only one hour at this temperature, the yield was 96%. The reaction was somewhat unpredictable, with yields varying by as much as 15% in seemingly duplicate runs. Two primary factors apparently contribute to low yields: presence of oxygen in the reaction vessel and removing the acetone from the hot vessel too slowly.

A French corporation developed an "improved process" for producing 4-heptanone (dipropyl ketone) by pyrolyzing calcium butyrate (Brit. Pat. 216120, Société Lefranc et Cie, 1925). Their process enabled a recovery of ketone "almost equal to the theoretical yield" given by Equation (2) above. The butyrate salt melts at 360° C., and becomes a "pasty, porous and spongy mass" that conducts heat poorly, and may trap ketone vapors within its pores. To prevent this, the investigators mixed the salt with an inert substance, such as clay or sand, in even proportions, and used a high-speed agitator in the reaction vessel. They found that the reaction began at 300–350° C., and that at 390–400° C., the rate of decomposition was adequate for significant ketone condensation. Whereas a pure salt decomposes to form a single ketone species, a mixture of different fatty acid salts yields a mixture of ketones (Lefranc, *Actualités Scientifique et Industrielles*, 936:3–27, 1943).

During World War II, a French company constructed a pilot-scale operation using 640 kg/h of acid salts (Depasse, *Bull. Assoc. Chim. Sucr. Distill. Fr.*, 62:317–339, 1945). They found that the reaction must take place in an anhydrous environment, because even the water dislodged from hydrated salts will dissolve some of the lighter ketones, creating a difficult and expensive separation problem. Thorough drying is therefore necessary before commencing with pyrolysis. Another phenomenon is that the mixed-ketone vapor is a complex azeotrope at temperatures below the condensation point of the most volatile ketone (Lefranc, 1943; Depasse, 1945).

Schultz and Sichels (*J. Chem. Ed.*, 38:300–301, 1961) pointed out substantial inconsistency in the body of knowledge on this process. Although many contemporary organic chemistry texts mentioned pyrolytic decomposition of fatty acid salts, indicating that the reaction gives high yields, the text cited relevant literature that gave little specific information about yields and composition of the product.

Because heat transfer from the reactor wall to adjacent solids is very slow, externally firing the reactor to provide reaction heat through the reactor wall is unsuitable for a large industrial process. In addition to requiring a very large reactor, uneven heating and long reaction times result in low yields due to production of side products by degradation of the ketones. Although it is possible to pass hot nitrogen gas through a bed of VFA salt in order to heat the salt for thermally converting a volatile fatty acid salt to a ketone, this approach requires very large heat exchangers to preheat the gas. Similarly, large heat exchangers are required to cool the gas and condense the ketone product. Thus, existing processes for pyrolytic conversion of organic acid salts to ketones are unsatisfactory, and there remains a need for improved processes.

SUMMARY OF THE INVENTION

It is an object of this invention to provide an improved method for pyrolytic conversion of organic salts to ketones.

In one embodiment, this invention provides a method for thermally converting volatile fatty acid (VFA) salts to ketones which comprises the steps of mixing dry metal salts of VFAs with a heat transfer agent in an evacuated container, the hot heat transfer agent being sufficient to raise the temperature of the metal salts of VFAs to cause thermal decomposition, with the resulting formation of ketone-containing vapor and metal salt of carbonate; and then separating the ketone-containing vapor from the metal carbonate salt and heat transfer agent, and recovering liquid ketones by condensing the ketone-containing vapor. Typically, a vacuum is maintained in the container by condensing the ketones from the ketone-containing vapor and also removing non-condensable gas from the container. In a preferred mode of this embodiment, the heat transfer agent is selected from steel balls, glass balls, ceramic balls and hollow balls. In a particularly preferred mode, the heat transfer agent is hollow balls that are filled with a substance that melts at the temperature of thermal decomposition of VFAs. In a preferred mode of this embodiment, the metal carbonate and heat transfer agent are removed from the container and separated from each other, followed by reheating and recycling of the heat transfer agent back to the container. Preferably, the metal salts of VFAs are alkali metal or alkaline earth salts, more preferably, calcium salts.

In a preferred mode of this invention, the heat transfer agent is heated in a novel gas-solid heat exchanger. The gas-solid heat exchanger includes (1) means for directing a stream of solid particles making up the heat transfer agent, the means including gas permeable walls, which are preferably one or more pairs of parallel screens with at least a portion of the first stream being directed between the pairs of parallel screens, and (2) means for directing a stream of gas transversely through the gas permeable walls so that gas in the second stream contacts particles in the first stream. In a particular embodiment of this mode of the present invention, gas-impermeable plates connect each pair of parallel screens to a second pair of parallel screens, thereby preventing the gas from flowing around the outside of the pair of parallel screens (which have solid heat transfer agent flowing inside them) and instead forcing substantially all of the gas stream to pass through at least one screen and contact particles in the solid stream. Preferably, the heat exchanger will be oriented so that the stream of solid particles is directed through the exchanger by gravity-feed. This invention also includes a method for transferring heat between a stream of solid particles and a stream of gas by flowing the stream of particles through the gas-solid heat exchanger described herein so that the flow of gas is substantially transverse to the flow of the stream of solid particles and heat is transferred between the particles of the solid stream and the gas of the gas stream.

In yet another embodiment, this invention provides a mixture of ketones by mixing dry calcium salts of VFAs with a hot heat transfer agent in an evacuated container, thereby causing thermal decomposition of the calcium salts of VFAs to form ketone-containing vapor and calcium carbonate; and separating the ketone-containing vapor from the calcium carbonate and heat transfer agent by condensing a mixture of ketones from the ketone-containing vapor. In a preferred embodiment, this invention provides a liquid fuel comprising a mixture of alcohols produced by hydrogenating the mixture of ketones.

In still another embodiment, this invention provides a method for thermally converting lactic acid salt to an ether, comprising mixing dry metal salts of lactic acid and heat transfer agent in an evacuated container, whereby heat transferred from the heat transfer agent raises the temperature of the metal lactic acid salt sufficiently to cause thermal decomposition of the metal lactic acid salt to form ether-containing vapor and metal salt of carbonate; and then separating the ether-containing vapor from the metal carbonate salt and heat transfer agent and condensing the ether from the vapor.

This invention is directed to an improved method for converting volatile fatty acids to ketones. Thermal conversion of metal salts of carboxylic acids to ketones is recognized to be a difficult reaction. Studies by the present inventors have shown a tendency to form unwanted byproducts (including degradation products) when VFA salts are heated to the temperatures necessary for conversion of the VFAs to ketones. The present process provides a way to avoid excessive side product formation while at the same time providing for highly efficient use of energy and recycling of intermediate components. A solid heat transfer agent (e.g. steel balls) is used, rather than a hot gas or external firing, to heat the VFA salts to the reaction temperature. The advantages of this process include its suitability for an industrial scale and elimination of the expense of large heat exchangers.

DETAILED DESCRIPTION OF THE INVENTION

Figure 1:
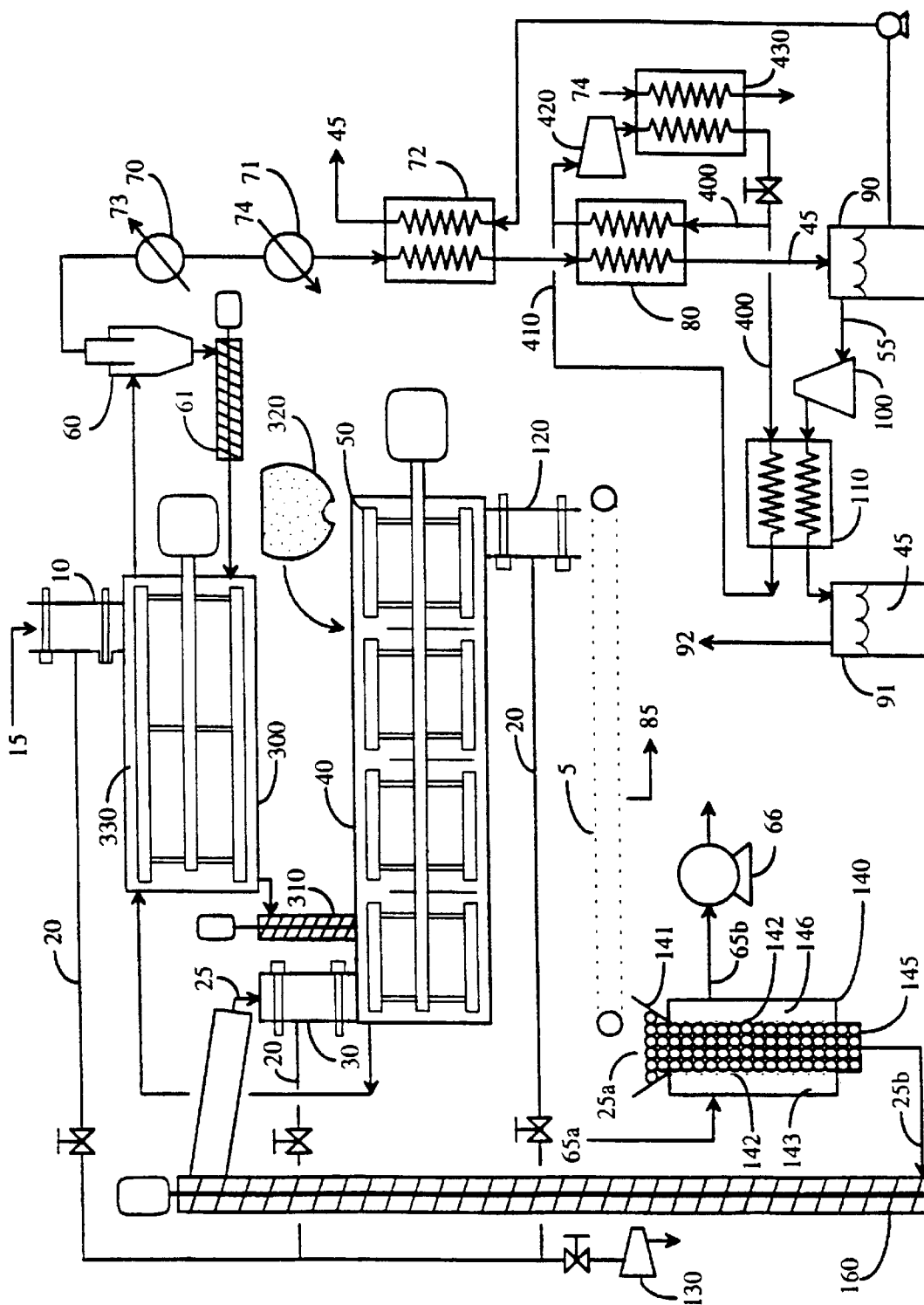
FIG. 1 is a schematic diagram of a system that thermally converts VFA salts to ketones. It includes a refrigeration system to condense the ketones.

Volatile fatty acids as contemplated by this invention are saturated aliphatic carboxylic acids with relatively low carbon number, such as acetic, propionic and butyric acids (carbon number 2–4). For example, all aliphatic carboxylic acids produced by "acid-forming" bacteria under anaerobic fermentation conditions are "volatile fatty acids." These carboxylic acids boil at relatively low temperature, and are therefore, designated "volatile." Table 1, showing the boiling points for normal alkyl carboxylic acids at atmospheric pressure, is given below:

TABLE 1

| Carbon No. | Acid | B.P. (° C.) |
|---|---|---|
| 2 | acetic | 118 |
| 3 | propionic | 141 |
| 4 | butyric | 164 |
| 5 | valeric | 184 |
| 6 | caproic | 202 |
| 7 | enthantic | 223 |
| 8 | caprylic | 238 |
| 9 | pelargonic | 253 |
| 10 | capric | 268 |

The process of this invention converts volatile fatty acids (VFAs), provided to the thermal conversion chamber as metal salts, into ketones in good yield. In the metal salts of VFAs, the anion portion of the salt is provided by the VFAs, whereas the cations are usually alkali or alkaline earth metal cations. Preferred salts include, e.g., lithium, sodium, potassium, magnesium, calcium or barium salts, or a mixture of two or more of these salts.

Sodium propionate melts at a temperature below its decomposition temperature (Duruz et al., 1971). In the absence of impurities, the decomposition yields primarily diethyl ketone and carbon monoxide. The presence of excess OH– ions causes the molten salt to decompose at a much lower temperature, with an increased yield of methane and ethane. Oxygen causes diethyl ketone to be completely suppressed, yielding "oxides of carbon," formaldehyde, acetone, and "substantial amounts of colored tar." Duruz, et al., proposed a free radical mechanism for decomposition.

The decomposition of calcium acetate to acetone and calcium carbonate is calculated to have an enthalpy of reaction of +220.6 kJ/mol at 25° C. and 1.0 atm (Stull, et al., 1969; Wagman, et al., 1982). The reaction is therefore expected to be endothermic. Enthalpy of formation data for calcium propionate and calcium butyrate are not available.

In the method of this invention, ketone-containing vapor is produced in a reaction chamber by thermal conversion of metal salts of two short-chain aliphatic acids to a ketone adduct leaving a metal carbonate salt. The reaction will occur at temperatures above 200° C., but the rate of the reaction increases as the reaction temperature increases. Industrially useful rates are achieved at temperatures above 350° C., preferably between 400° C. and 450° C. Selection of suitable operating temperatures is within the skill in the art, in view of the guidance provided below and in Example 1.

For a given flow of reactant through the process, the size of the reactor required to accommodate the flow is reduced as the temperature is increased. Reduction in the size of the reaction vessel is beneficial to reduce the capital cost associated with the process and also to reduce the time required for the ketone-containing vapor to travel from the site of the reaction to a condenser where it is cooled and condensed. As the ketone product stream is cooled more quickly, fewer undesirable side products will be formed.

Direct heating of the thermal conversion container to transfer reaction heat through the container wall to the VFA salt is disadvantageous because the heat transfer is so slow. This results in a large overall reactor size, and can lead to generation of substantial amounts of unwanted side-reactions because the reactants and products are at high temperature for an extended period. To reduce the residence time, the reaction chamber could be heated by flushing with a hot, inert gas (e.g., $N_2$). Use of inert gas to transfer heat would reduce the side-product formation, as the ketone-product-containing vapor would be swept out of the reaction chamber and could be cooled more quickly; however, the size of the equipment, which must be scaled to accommodate the large volume of sweep gas, would not be reduced, not to mention the large heat exchangers necessary to raise the temperature of the heating gas. Furthermore, use of sweeping gas complicates down-stream recovery, which must now recover dilute ketone vapor from a large volume of carrier gas.

On the other hand, great reduction in the size of the reaction vessel is accomplished according to this invention by a novel choice of the method for heating the VFA salts. This invention provides a novel heating method by injecting a preheated heat transfer agent of high heat capacity into the reaction vessel. Suitable heat transfer agents are inert particles with high heat capacity, such as glass or steel beads. The preheated heat transfer agent is mixed with dry metal-VFA salts to achieve intimate contact which provides rapid heating of the salt, and consequently rapid conversion to ketone (vapor) and metal carbonate salt. The heat transfer agent can be recovered, reheated and recycled into the reaction chamber.

The ketone products are in vapor form at the temperature of the thermal conversion, and the ketone products are removed from the chamber by a vacuum generated by cooling and condensing the ketones found in the product vapor. The pressure in the thermal converter is determined in part by the temperature of the ketone condenser which is in vapor communication with the thermal convertor. However, non-condensable gases will accumulate in the chamber due to, for example, interstitial air trapped in the reactant powder feed for the chamber or side products of the VFAs (e.g., CO or methane). Therefore, a vacuum pump to remove non-condensables from the ketone condenser will usually be included in the process. By connecting the reactor to a condensing section to remove ketones, and a vacuum pump to remove non-condensible contaminants, the ketone vapor is rapidly transported out of the hot reaction chamber and into the cooler condensing section, thereby minimizing side product formation.

In an alternative embodiment, the process according to this invention can be used to produce aldehydes by including calcium formate (or another metal formate salt) with the VFA salts introduced into the reaction chamber. This will usually produce mixed aldehyde/ketone product which can be separately by distillation. Alternatively, the mixed aldehyde/ketone product can be hydrogenated to produce mixed primary and secondary alcohols.

Heat Transfer Agents

With no medium other than the reactant salt, temperature control in the reactor is inconsistent, with char remaining inside the reactor after a run which indicated that the contents had been poorly mixed. Several different internal media were tried, to determine which would give the best mixing and thermal conduction properties while minimizing both the wear on the reactor interior and reducing the surface area available for catalysis of undesired reactions. The most successful heat transfer medium tested was 3-mm Pyrex glass beads.

Clay or sand has been added to a calcium butyrate charge prior to heating to prevent clumping during mixing in the reactor (Société Lefranc et Cie, "An improved process for the manufacture of dipropylketone," British Patent No. 216120 (1925).) These materials could possibly serve as the heat transfer agent in the present process, but they are not easily separated from the calcium carbonate product. Both ordinary and smooth "frac" sand created problems in test reactions. The sand abraded a bronze bushing near the bottom of the agitator, causing the bushing to require replacement after each run. The sand was so heavy that it had to be loaded in two stages to prevent the agitator from being jammed. During operation, the sand produced fine powder which contributed to plugging.

An alternative embodiment could use the calcium carbonate product as the heat transfer agent. Our experience with this approach indicates that excess calcium carbonate catalyzes undesirable reactions. Calcium carbonate ($CaCO_3$) also contributed to plugging, as well as seemingly providing a large surface area for catalysis of undesirable reactions. Runs with $CaCO_3$ as the heating agent gave lower yields than duplicate runs with glass beads.

Preferred heat transfer agents are glass (e.g., Pyrex) or ceramic (e.g., alumina) beads or beads of an inert metal or alloy (e.g., carbon steel or stainless steel). Preferably these particles have smooth, non-catalytic surfaces to avoid catalysis of side reactions degrading ketones and decreasing yield. The particles should be small enough to provide rapid heat transfer to the metal-VFA salt powder; but too-small particles appear to provide excessive surface, and catalyze undesirable side reactions. Preferably the particles will have a surface-area-to-volume ratio of less than 10 $mm^{-1}$; more preferably the surface-area-to-volume ratio will be in the range from 1–5 $mm^{-1}$. (The smooth surfaced "frac" sand had a surface-area-to-volume ratio of 12 $mm^{-1}$).

Relying on transfer of sensible heat from inert solid particles in intimate contact with the VFA salt facilitates rapid heating and allows adequate throughput with smaller process equipment. Making use of latent heat could further reduce the size of equipment (e.g. lock hoppers, screw conveyors, thermal convertor, heater) for a given throughput. This may be accomplished by using hollow beads filled with a substance (e.g. metal, salt) that melts at the desired reaction temperature. The substance would melt in the heater and solidify in the thermal convertor, transferring the heat of fusion to the metal salt. Substances with melting points in the desired range are listed in Table 2.

TABLE 2

Substances Suitable as Latent Heat Sinks

| Material | Melting Point (° C.) |
|---|---|
| Metals | |
| Zinc | 419 |
| Zilloy (Zn, Cu 1%) | 422 |
| Salts | |
| $CsO_3$ | 400 |
| $PbI_2$ | 402 |
| $SrI_2$ | 402 |
| $CsNO_3$ | 414 |
| $CsBrO_3 3$ | 420 |
| $BeI_3$ | 439 |
| BeCl | 440 |
| LiOH | 445 |
| LiI | 446 |
| $ZnI_2$ | 446 |

TABLE 2-continued

Substances Suitable as Latent Heat Sinks

| Material | Melting Point (° C.) |
|---|---|
| $Cs_2S_2$ | 460 |
| $K_2S$ | 471 |
| $K_2S_2$ | 471 |
| $CuBr_2$ | 498 |

Process Overview

In a typical process, a solution of the metal salts of volatile fatty acids is concentrated from fermentation broth. The pH is preferebly adjusted to neutrality to reduce the likelihood of undesirable reactions that may result from excess alkalinity. Then the salts are dried.

FIG. 1 shows a schematic representation of a typical process for converting dry salts to ketones. Metal salts of volatile fatty acid 15 (VFA salts; e.g. calcium acetate, propionate, and butyrate) are added to the lock hopper 10. A vacuum 20 is pulled on the salts to remove interstitial air which is vented into the atmosphere, and then the salts are fed into thermal convertor 40. Optionally, the VFA salts may be first introduced into preheater 300, where they are contacted by hot ketone-containing vapors from the thermal convertor passing countercurrently. Agitator 330 ensures intimate contact of the hot ketone vapors with the VFA salt. Preheated VFA salts are then fed into the thermal convertor by solids conveyor 310. Simultaneously, hot heat transfer agent 25 (e.g. steel balls, glass balls, ceramic balls) is added to another lock hopper 30. A vacuum 20 is also pulled on lock hopper 30 containing hot heat transfer agent to remove interstitial air (which is vented into the atmosphere) so it too can be added to thermal convertor 40. The contents of the two lock hoppers are added to an air-tight chamber (thermal convertor 40), where mixing impeller 50 ensures intimate contact of the heat transfer agent with the VFA salts, so that the temperature of the VFA salts increases, and they thermally decompose to form ketones (in a ketone-containing vapor) and metal carbonate salts as powder mixed with the heat transfer agent. Thermal convertor 40 preferably is partitioned into multiple chambers by dividers 320 to ensure that the solids progress through the convertor in approximately a plug-flow manner.

The reaction typically proceeds at approximately 430° C. Although thermal decomposition of organic acids to form ketones has been reported at temperatures as low as 160° C., higher temperatures are preferred for industrial-scale processing. Reactor temperatures will usually be above 350° C., more usually above 400° C. Preferred reaction temperatures are between 400° C. and 450° C. Although calcium acetate does not melt, calcium butyrate does so below its decomposition temperature, and therefore must be agitated, as described above. The particularly preferred temperature for pyrolyzing a mixture of salts is about 430° C.

The ketone product vapor is directed to cyclone 60 (optionally after transiting preheater 300) where entrained powder is removed and returned to the thermal convertor (or preheater) by screw conveyor 61, and then ketones are collected by cooling and condensing them from the vapor. Suitable operations include one or more of those shown in FIG. 1. As shown in FIG. 1, the hot ketone vapors are desuperheated in a desuperheater 70 where steam 73 is produced, and then in desuperheater 71 which is cooled by cooling water 74. Vapors are further cooled in countercurrent heat exchanger 72 which is cooled by cold ketone product, and condensed in condenser 80. Condensed ketones 45 are collected in a knock-out drum 90. Noncondensibles 55 (e.g. leakage or side-product gases) are removed using vacuum pump 100. The noncondensibles are sent through chiller 110 to condense remaining ketones 45 which are collected in knock-out drum 91. The noncondensables are sent to a combustor 92. Condenser 80 and chiller 110 are cooled by liquid refrigerant 400 which vaporizes to become refrigerant vapors 410. The vapors are compressed by compressor 420 and condense in condenser 430 in which the heat is rejected to cooling water 74.

The thermal convertor 40 is operated under vacuum; the pressure is determined by the temperature of refrigerant 400 in condenser 80. Lower temperatures in the condenser reduce the vapor pressure of the condensed ketones, which reduces the vapor density in the thermal convertor and hence reduces the residence time of the vapors in the thermal convertor. Low vapor density in the thermal convertor is important because excessively long residence times will cause the ketones to degrade. To achieve low pressure in thermal convertor 40, the heat transfer fluid in condenser 80 must be cold, thus requiring refrigeration.

Ideally, to ensure complete conversion, the solids would move through the thermal convertor in a plug flow manner. In actuality, there will be some backmixing due to the mixing impeller. The deleterious effects of backmixing can be reduced by making thermal convertor 40 long relative to its diameter. Additionally, back mixing can be reduced by partitioning thermal convertor 40 into chambers using dividers 320.

Once the reaction is complete, the metal carbonate residue and heat transfer agent can be removed to lock hopper 120 which has been previously evacuated to vacuum 20. The metal carbonate and heat transfer agent will have interstitial ketone vapors which are removed using vacuum pump 130 and sent to condenser 80 for recovery. Metal carbonate powder 85 is separated from heat transfer agent 25 prior to discharge of the solids into heater 140. In the process shown in FIG. 1, the separation is accomplished by employing vibrating screen 5 which retains heat transfer agent 25, but allows metal carbonate powder 85 to drop through and be collected.

Figure 2:
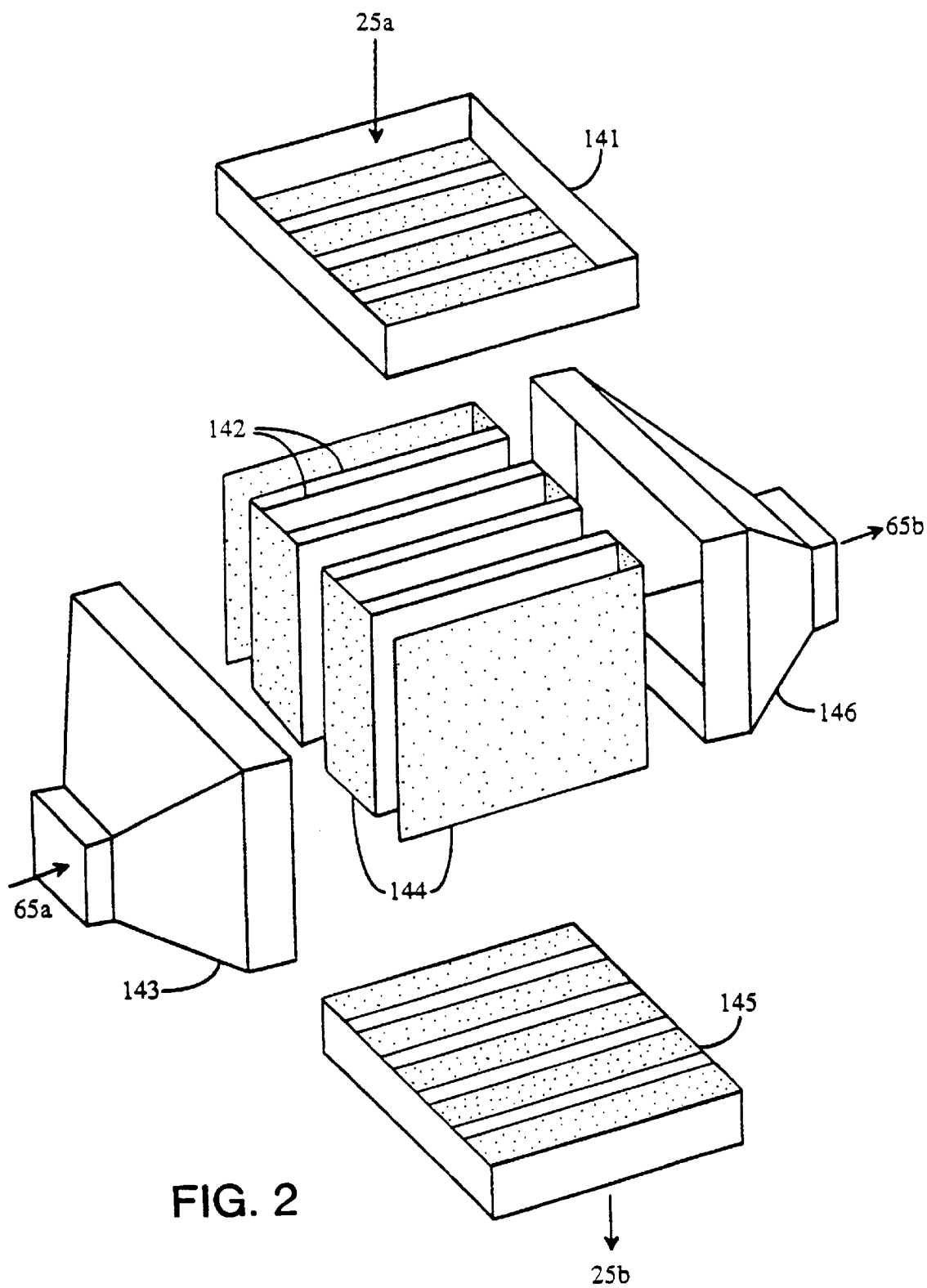
FIG. 2 is a schematic of the heat exchanger that heats the heat transfer agent.

Heat transfer agent 25 is returned to heater 140, which is shown in greater detail in FIG. 2. Cold heat transfer agent 25a is placed in upper distributor 141 which directs heat transfer agent 25 through parallel screens 142. Heat transfer agent 25 flows by gravity between parallel screens 142. Blower 66 forces hot gas 65a (e.g. exhaust gases from a burner or lime kiln) to enter inlet gas distributor 143. Solid panels 144 force the hot gas 65a through parallel screens 142 and through heat transfer agent 25. Heat transfer agent 25 flows by gravity through lower distributor 145 and exits as hot heat transfer agent 25b. Cooled gases 65b are collected by outlet gas distributor 146. Cooled gases 65b may be exhausted to the atmosphere, used to generate steam, or preheat combustion air. To aid the flow of heat transfer agent 25 through heater 140, it may be necessary to vibrate heater 140. Hot heat transfer agent 25 is removed by screw conveyor 160 and is introduced back into thermal convertor 40.

Figure 3:
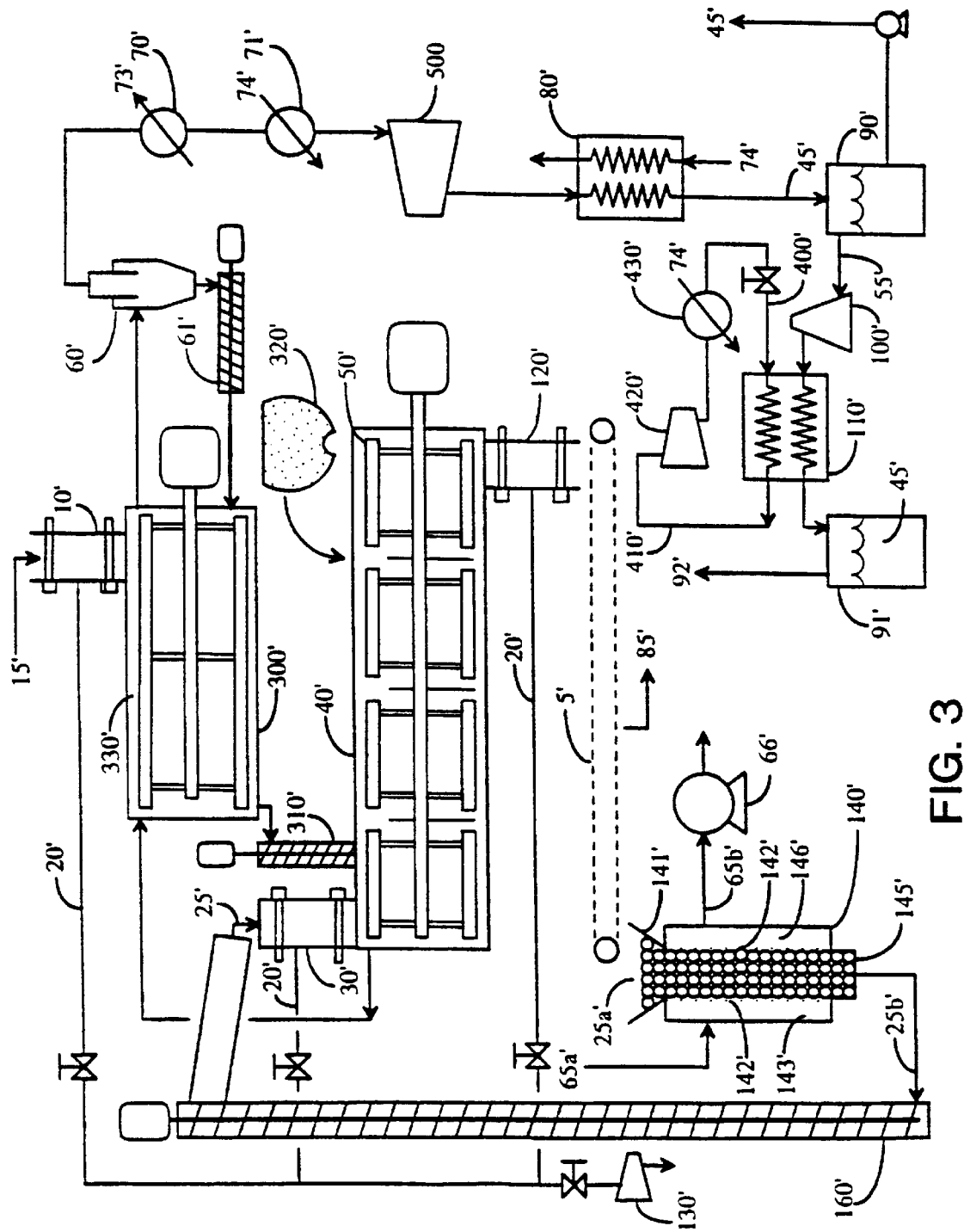
FIG. 3 is a schematic of a system that thermally converts VFA salts to ketones. It includes a compressor to condense the ketones.

FIG. 3 shows an alternative embodiment in which the ketones are condensed against cooling water rather than a refrigerant. Primed reference numbers indicate elements with functions equivalent to those described for FIG. 1. Compressor 500 compresses the low-pressure ketone vapors to a high pressure where they condense in condenser 80'.

It is possible that the ketones produced according to this method may be inexpensive enough for use as motor fuel. However, because ketones are not currently accepted for blending in fuel, the ketones would preferably be hydrogenated before use in a motor fuel. The liquid ketone product can be converted to alcohols by hydrogenation at approximately room temperature by contacting the ketone with hydrogen gas using a Raney nickel catalyst.

The hydrogenation may be performed at 1 atm total pressure and near-ambient temperature using Raney nickel catalyst. The reaction proceeds more rapidly at higher temperatures, but the equilibrium becomes less favorable. Comparing the hydrogenation rates of low-molecular-weight ketones formed from volatile fatty acids at 40° C., they are all very similar and differ at most by a factor of two.

Hydrogen could readily be derived from reformed natural gas, an abundant domestic energy source. In large-scale production, hydrogen costs about the same as gasoline per unit of energy, so there are no economic penalties associated with its use. The ketone may be viewed as a hydrogen carrier which avoids the need for high-pressure tanks to store gaseous hydrogen in automobiles.

EXAMPLES

In order to facilitate a more complete understanding of the invention, a number of Examples are provided below. However, the scope of the invention is not limited to specific embodiments disclosed in these Examples, which are for illustration purposes only.

Example 1
Thermal Decomposition of Organic Acid Salts

Thermogravametric analyses performed for each of six VFA salts show that the decomposition of calcium acetate and calcium butyrate begins above 360° C. and that of calcium propionate above 320° C., and that the sodium salts decompose at a significantly higher temperature than the calcium salts (about 420° C.). On an industrial scale, calcium salts would therefore be less expensive to decompose. In addition, calcium salts are more easily dewatered than sodium salts, and the lime (CaO) used in the dewatering process is less expensive than NaOH making calcium a preferred cation for the VFA salts used in the method of this invention.

With the exception of calcium propionate, the decomposition temperatures are not significantly different for each species. If the decomposition behavior of each species remains roughly the same in a mixture of salts, it would be difficult to obtain a fractionated product by heating the mixture to different temperatures. For example, heating a mixture of calcium butyrate and calcium acetate to a temperature of 415° C., and maintaining this temperature while the sample decomposed, would be expected to produce a fairly even mixture of ketones, rather than a mixture dominated by acetone or 4-heptanone. The latter case could occur if the acetate decomposition rate were significantly faster than that of the butyrate, but thermogravametric analysis shows that this is not the case.

Calcium propionate was observed to decompose at about 320° C., whereas calcium acetate and calcium butyrate did not commence decomposition until about 360° C. The propionate salt appeared to have a constant decomposition rate from 320 to 360° C., then its decomposition increased to a faster rate at about the same temperature at which the other two salts began decomposing. Later experimental propionate pyrolysis did not indicate that decomposition occurred below 360° C., but did indicate two distinct regions of decomposition behavior. Although there is no literature value available for the melting temperature of calcium propionate, it is possible that the earlier region corresponds to a range where the salt decomposes as a solid, and then a phase change occurs at 398° C. (either the salt melts or the crystalline structure changes) and the reaction continues with a different mechanism and therefore a different rate. At temperatures above 420° C., decomposition for all three calcium salts is quite rapid. These results give a rough idea of the temperatures at which the reactor should be run in view of the kinetics and yields of these reactions. Ardagh and his coworkers report detection of acetone production as low as 160° C. (Ardagh et al., 1924). Significant decomposition of calcium acetate was not observed below 360° C.; however, it is possible that a small amount of decomposition had occurred below this temperature.

Table 3 presents the observed ratios between the initial and final masses for each of six salt samples, and the theoretical ratios based on 100% conversion to the expected ketone product. All of the samples decomposed to the theoretical ratios except for the calcium butyrate sample, which may reflect experimental error.

TABLE 3

Decomposition ratios

| Salt: | Ca(Ac)$_2$ | Ca(Pr)$_2$ | Ca(Bu)$_2$ | NaAc | NaPr | NaBu |
|---|---|---|---|---|---|---|
| Actual: | 0.634 | 0.546 | 0.685 | 0.644 | 0.560 | 0.480 |
| Theor.: | 0.633 | 0.537 | 0.467 | 0.646 | 0.552 | 0.481 |
| % Diff | 0.16% | 1.1% | 46.7% | 0.31% | 1.4% | 0.21% |

The thermal conversion of calcium acetate, propionate, and butyrate to 2-propanone (acetone), 3-pentanone, and 4-heptanone, respectively, is a first-order reaction. The rate constants shown in Table 5 follow an Arrhenius dependence on temperature. The Arrhenius constants for each species shown in Table 4 are similar except for calcium propionate below 398° C. The reactions are very rapid; at 440° C., it takes less than one minute to achieve 90% conversion.

TABLE 4

Arrhenius constants for decomposition

| Salt: | Ca(Ac)$_2$ | Ca(Pr)$_2$ | Ca(Bu)$_2$ |
|---|---|---|---|
| Yield (% of theoretical) | 93.1% ± 0.9 | 87.5% ± 0.7% | 94.4% .1 ± 0.9 |
| E(activation energy, kJ/mol) | + 642.6 ± 28.0 | + 2327. ± 162. (1) + 691.7 ± 73. (2) | + 386.5 ± 15.9% |
| A(frequency factor, min$^{-1}$) | 109.4 ± 0.4 | + 414.7 ± 0.4. (1) + 121.1 ± 0.2 (2) | 66.12 ± 0.22 |

(1) = 398° C. and below; (2) = 399° C. and above; error margins given for the kinetic constants are two standard deviations from the mean, thereby including 95.45% of the points. For the yield calculation, the error was assumed to be a margin of ±0.1 g in the mass of the condensate obtained.

The thermal decomposition is quite selective to liquid products with theoretical yields over 93% for calcium acetate and butyrate, and over 87% for calcium propionate. Gaseous products account for the remaining material. In the liquid product, over 90% is the primary product (2-propanone, 3-pentanone, 4-heptanone) with other ketones being the dominant by-products. The composition of the liquid product was remarkably independent of the temperature, even at very high temperatures (i.e., above 450° C.), indicating that the products are stable at the reaction conditions.

Example 2
Pyrolysis of Calcium Salts of Carboxylic Acids

Various VFA salts were pyrolyzed in a laboratory-scale reactor which was evacuated through a dry ice condenser. In a typical run, VFA salts were added to the reactor, and the reactor was evacuated by a vacuum pump and allowed to approach a desired temperature. VFA salts decomposed, yielding gaseous and solid products. The gaseous products left the reactor, going through a filter and then the condenser tube, which was immersed in a dry ice/isopropanol bath. Condensible products were trapped in the tube, but non-condensible gases passed through the condenser and were collected in a large evacuated chamber.

The reaction rate with respect to temperature was determined from kinetic data for the amount of condensate obtained at a particular time, in view of the temperature at that time, using the Arrhenius equation and the first-order rate equation. Reaction rates are tabulated in Table 5, and Table 6 compares the time required for 90% conversion of each salt. For calcium propionate, the parameters for points below 399° C. were different from the parameters for the rest of the data.

TABLE 5

Rates of ketone production with respect to temperature

| Salt: | Ca(Ac)$_2$ | Ca(Pr)$_2$ | Ca(Bu)$_2$ |
|---|---|---|---|
| | $\frac{\text{g acetone}}{\text{g salt-min}}$ | $\frac{\text{g DEK}^a}{\text{g salt-min}}$ | $\frac{\text{g DPK}^b}{\text{g salt-min}}$ |
| 390° C.: | 2.76 × 10$^{-4}$ | 2.41 × 10$^{-4}$ | 8.40 × 10$^{-3}$ |
| 400° C.: | 1.56 × 10$^{-3}$ | 0.0367 | 0.0238 |
| 410° C.: | 8.37 × 10$^{-3}$ | 0.224 | 0.0655 |
| 420° C.: | 0.0429 | 1.30 | 0.175 |
| 430° C.: | 0.209 | 7.16 | 0.454 |
| 440° C.: | 0.979 | 37.7 | 1.15 |

$^a$DEK = diethyl ketone = 3-pentanone
$^b$DPK = dipropyl ketone = 4-heptanone

TABLE 6

Time required for 90% conversion

| Salt: | Ca(Ac)$_2$ | Ca(Pr)$_2$ | Ca(Bu)$_2$ |
|---|---|---|---|
| 390° C.: | 2900. min | 4419. min | 125. min |
| 400° C.: | 513. | 29.1 | 44.1 |
| 410° C.: | 95.5 | 4.76 | 16.04 |
| 420° C.: | 18.7 | 0.820 | 6.01 |
| 430° C.: | 3.82 | 0.149 | 2.31 |
| 440° C.: | 0.817 | 0.0283 | 0.915 |

Temperatures over 420° C. reduce reaction times down to a matter of minutes, and even seconds in the case of propionate.

In each of the runs, the system pressure increased slightly. The vapor pressures of the ketones at their condensation temperatures gas were too low to contribute significantly to this pressure, so it may be assumed that non-condensible gas (e.g., CO) caused the pressure to increase. Table 7 presents these pressure increases and the corresponding losses of the initial charges of VFA salt. The percent loss for the butyrate run seems quite high; if the mass yield were 94.4% of the theoretical and as much as 7% of the salt produced gas, then some of the other products (i.e. not 4-heptanone) must have condensed as well.

TABLE 7

Percent of salt lost due to assumed CO production

| Salt: | Ca(Ac)$_2$ | Ca(Pr)$_2$ | Ca(Bu)$_2$ |
|---|---|---|---|
| Pressure rise (in Hg): | 0.30 | 0.22 | 0.29 |
| Loss of salt (%): | 3.62 | 2.92 | 7.30 |

All of the data reported above came from a single run of each salt. To demonstrate that these runs are repeatable and give reliable kinetic data, an additional decomposition run for calcium acetate was performed. In this case, the temperature increased at a faster rate than original run, and the reactor interior reached a much higher temperature. As a result, the yield was slightly lower (89.5%), and the conversion data are therefore less accurate; the Arrhenius parameters differed by about 8% from the previous result.

Example 3

Pyrolysis with Heat Transfer Media

In this example, the reactor of Example 2 was filled with various heat transfer media and brought to temperature before the VFA salt was added. In a typical run, the reactor was evacuated by a vacuum pump and allowed to approach a desired temperature. VFA salts added to the reactor at the appropriate temperature decomposed, yielding gaseous and solid products, which were quantitated as in Example 2.

The decomposition behavior of samples at constant temperatures indicate that this is a first-order reaction—that is to say that the rate of reaction depends linearly on the concentration of the reactant. According to first-order kinetics, a plot of −ln(100−% of total condensate at time t) vs. time for a run under these conditions should be a straight line, and that was observed in decomposition runs at 416° and 433° C. Both these runs were conducted with sand as the internal medium before a large filter was installed in the line before the condenser; the presence of fine sand particles was observed in the condensate.

The slope of the plot mentioned above at 416° C., which should equal the rate constant k at that temperature, is 0.01926 min$^{-1}$. Using the kinetic parameters from Example 2, the rate constant k at 416° C. is calculated to be 0.06457 min$^{-1}$, which is 3.4 times greater than the rate calculated from the slope. For 433° C., the slope is 0.08281 min$^{-1}$, while the kinetic parameters from the Arrhenius calculation give 0.9620 min$^{-1}$, which is 11.6 times greater.

Yields were obtained for small sample decomposition runs over a range of temperatures (415° C.–510° C.). Yields for calcium propionate varied from 90–96% except for a yield of 80% at 416° C.; yields for calcium butyrate varied between 72–75%, except for a yield of 60% at 509° C.; and yields for calcium acetate varied between 60–65%. The propionate yields were much higher than the other two; this is probably because calcium propionate is not a hydrated salt, whereas the other two are. The water of hydration presents a problem for these runs, because when the sample is forced into the reactor at high temperature, the water is driven off quite rapidly, and causes a rush of vapor out of the reactor. As a result, significant amounts of unreacted salt may be blown out of the reactor and into the filter.

While it appeared from observation of the condensate that the yield of acetone from calcium acetate increases with temperature, gas chromatography data for these samples reveal that this is unlikely. At 417° C., 29 unknown species were detected in addition to acetone, and four of these appear to have significant concentrations. The acetone peak has an area equivalent to 96% of the peak for the acetone standard, so by volume, the sample may contain 97% acetone. Unfortunately, it appears that the acetone peak was not resolved from the nearby peak of a significant impurity, so 97% may be too high. The samples at higher temperatures (over 450° C.) contained as many as 42 species in addition to acetone, with the largest such peak approximately one-third the area of the acetone peak. Also, the higher-temperature samples had acetone peaks that were greater than the area of the acetone standard peak, indicating that the acetone could not be resolved from the other impurities.

Several different internal media were tried, to determine which would give the best mixing and thermal conduction properties while minimizing both the wear on the reactor interior and reducing the surface area available for catalysis of undesired reactions. 3-mm Pyrex glass beads were the most successful of the media tested. With no medium, the temperature readings appeared to be quite inaccurate, and the char remaining inside the reactor after a run indicated that the contents had been poorly mixed. Both ordinary and smooth "frac" sand created many problems. The sand abraded a bronze bushing near the bottom of the agitator, causing the bushing to require replacement after each run. The sand was so heavy that it had to be loaded in two stages to prevent the agitator from being jammed. During operation, the sand produced fine powder which contributed to plugging. Calcium carbonate ($CaCO_3$) also contributed to plugging, but also seemed to provide a large surface area for catalysis of undesirable reactions; runs with $CaCO_3$ gave significantly lower yields than duplicate runs with glass beads.

Table 8 presents the advantages and disadvantages of each internal medium that was used.

TABLE 8

Media characterstics

| Medium | Advantages | Disadvantages |
| --- | --- | --- |
| Nothing (Empty reactor) | No problems associated with charging and cleaning medium; | Poor mixing; inaccurate temperature measurement; char observed |
| Regular sand | Good mixing compared to calcium carbonate; less surface for catalysis | Heavy abrasion; difficult to load; many fine particles |
| Frac sand | Good mixing compared to calcium carbonate; less surface for catalysis | Heavy abrasion; many fine particles produced |
| Calcium carbonate | Can be reused many times | Poor mixing; plugs tubes easily; catalyzes other reactions |
| Soda glass beads | Easily loaded and removed; excellent mixing; minimal surface for catalysis | Easily ground up; frequent replacement required |
| Pyrex glass beads | Easily loaded, removed; excellent mixing; minimal surface for catalysis | Must be cleaned with dilute acid solution |

Example 4
Conversion of Mixed Fatty Acids to Liquid Fuel

This method produces ketones (e.g. acetone, methyl ethyl ketone, diethyl ketone, etc.) from organic acid salts (e.g. acetate, propionate, butyrate). Although many organic acid salts or their mixtures could be used, calcium acetate will be shown as an illustrative example. Calcium acetate can be converted almost stoichiometrically to acetone and calcium carbonate by pyrolyzing at 400–450° C. It is important to remove the acetone as soon as it is formed since it will decompose at those high temperatures.

The dry calcium acetate is transported to the pyrolyzer lock hopper using a screw conveyor. When the lock hopper opens, the calcium acetate enters the thermal convertor where it is mixed with a hot transfer medium (e.g., glass beads). The calcium acetate reacts to form calcium carbonate and acetone. The acetone is cooled by contacting it with incoming calcium acetate, then it is condensed and recovered. The vapor pressure of acetone is fairly low if the acetone is condensed at low temperatures, thus allowing the thermal convertor to operate under a vacuum. This ensures that the acetone has a short residence time in the thermal convertor. The required residence time of the solids is about 10 minutes (depending on the temperature for a complete reaction). Because some noncondensibles may enter the thermal convertor, a small vacuum pump will be needed to remove them.

Calcium carbonate exiting the thermal convertor is separated from the heat transfer medium. The calcium carbonate may be sent to a lime kiln to convert it to lime. The heat transfer agent is heated by direct contact with hot gases, such as those exiting the lime kiln or a combustor.

The methods are exemplified by single product (e.g. acetic acid, acetone), but the method is also suitable for mixtures of volatile fatty acids. However, it will be necessary to distill the products recovered from thermal conversion of mixed fatty acids if a pure product is desired. This may, or may not, be necessary. For example, if the ketone products are to be hydrogenated to alcohols that are blended into motor fuel, the mixed ketone products are sufficient. However, if chemical-grade acetone is going to be sold, it will have to be separated from the higher ketones (e.g. methyl ethyl ketone, diethyl ketone) using distillation or other appropriate technologies.

For purposes of clarity of understanding, the foregoing invention has been described in some detail by way of illustration and example in conjunction with specific embodiments, although other aspects, advantages and modifications will be apparent to those skilled in the art to which the invention pertains. The foregoing description and examples are intended to illustrate, but not limit the scope of the invention. Modifications of the above-described modes for carrying out the invention that are apparent to persons of skill in biochemical, chemical and fermentation engineering and/or related fields are intended to be within the scope of the invention, which is limited only by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

We claim:

1. A method for thermally converting volatile fatty acid (VFA) salts to ketones, comprising
    mixing dry metal salts of VFAs with preheated heat transfer agent in an evacuated container, whereby the temperature of the metal salts of VFAs is raised sufficiently to cause thermal decomposition of the metal salts of VFAs to form ketone-containing vapor and metal salt of carbonate; and
    separating the ketone-containing vapor from the metal carbonate salt and heat transfer agent and recovering ketones by condensing the ketone-containing vapor.

2. The method of claim 1, wherein the metal salts of VFAs are alkali metal or alkaline earth salts.

3. The method of claim 1, wherein the metal salts of VFAs are calcium salts.

4. The method of claim 3, further comprising removing a mixture of calcium carbonate and heat transfer agent from the container; and separating the heat transfer agent from the calcium carbonate, followed by reheating and recycling of the heat transfer agent.

5. The method of claim 1, wherein the heat transfer agent is selected from steel balls, glass balls, ceramic balls and hollow beads.

6. The method of claim 5, wherein the hollow beads are filled with a substance that melts at the temperature of thermal decomposition of VFAs.

7. The method of claim 1, wherein a vacuum is maintained in the container by condensing the ketones from the ketone-containing vapor and removing non-condensable vapor from the container.

8. The method of claim 7, further wherein the ketone-containing vapor is compressed prior to condensing.

9. A method for producing low-molecular-weight ketones from volatile fatty acids, comprising:
   precipitating calcium salts of volatile fatty acids (VFAs) selected from the group consisting of acetate, propionate and butyrate;
   drying precipitated calcium salts of VFAs;
   mixing the dry calcium salts of VFAs with preheated heat transfer agent selected from steel balls, glass balls, ceramic balls and hollow beads filled with a substance that melts at the temperature of thermal decomposition of VFAs in a container, thereby causing thermal decomposition of the calcium salts of VFAs to form ketone-containing vapor and calcium carbonate;
   maintaining a vacuum in the container by condensing ketones from the ketone-containing vapor and removing non-condensable vapor from the container;
   removing a mixture of calcium carbonate and heat transfer agent from the container; and
   separating the heat transfer agent from the calcium carbonate, reheating and recycling the heat transfer agent.

10. A mixture of ketones produced from volatile fatty acids by:
   drying precipitated calcium salts of VFAs;
   mixing dry calcium salts of VFAs with preheated heat transfer agent in an evacuated container, causing thermal decomposition of the calcium salts of VFAs to form ketone-containing vapor and calcium carbonate; and
   separating the ketone-containing vapor from the calcium carbonate and heat transfer agent by condensing a mixture of ketones from the ketone-containing vapor.

11. A liquid fuel comprising a mixture of alcohols produced by hydrogenation of the mixture of ketones produced according to claim 10.

12. A method for thermally converting volatile fatty acid (VFA) salts to mixed aldehydes and ketones, comprising
   mixing dry metal salts of VFAs, at least one dry metal formate salt, and preheated heat transfer agent in an evacuated container, whereby the temperature of the metal salts is raised sufficiently to cause thermal decomposition of the metal salts to form vapor and metal salt of carbonate, said vapor containing mixed aldehydes and ketones; and
   separating the vapor from the metal carbonate salt and heat transfer agent and condensing mixed aldehydes and ketones from the vapor.

13. A method for thermally converting lactic acid salt to an ether, comprising
   mixing dry metal salts of lactic acid and preheated heat transfer agent in an evacuated container, whereby heat transferred from the heat transfer agent raises the temperature of the metal lactic acid salt sufficiently to cause thermal decomposition of the metal lactic acid salt to form ether-containing vapor and metal salt of carbonate; and
   separating the ether-containing vapor from the metal carbonate salt and heat transfer agent and condensing the ether from the vapor.

14. The method of claim 1, wherein the preheated heat transfer agent is a particulate solid preheated by flow through a solid-gas heat exchanger, said heat exchanger including:
   means for directing a first stream of solid particles consisting of said heat transfer agent, said means including gas permeable walls; and
   means for directing a second stream of gas transversely through the gas permeable walls so that gas in the second stream contacts particles in the first stream,
   wherein the flow of the stream of gas is substantially transverse to the flow of the stream of solid particles and heat is transferred between the particles of the first stream and the gas of the second stream.

15. The method of claim 14, wherein the means for directing the first stream of solid particles includes at least one pair of parallel screens, at least a portion of the first stream being directed between the parallel screens.

16. The method of claim 15, wherein a gas-impermeable plate connects said at least one pair of parallel screens to a second pair of parallel screens, thereby forcing substantially all of the gas in the second stream to pass through at least one screen and contact particles in the first stream.

17. The method of claim 15, wherein the first stream of solid particles is gravity-fed.

* * * * *